(12) United States Patent
Helfer

(10) Patent No.: US 8,833,192 B2
(45) Date of Patent: Sep. 16, 2014

(54) GEARING PROFILE WITH CONSTANT TORQUE

(75) Inventor: Jean-Luc Helfer, Le Landeron (CH)

(73) Assignee: Eta SA Manufacture Horlogere Suisse, Grenchen (CH)

( * ) Notice: Subject to any disclaimer, the term of this patent is extended or adjusted under 35 U.S.C. 154(b) by 269 days.

(21) Appl. No.: 13/292,565

(22) Filed: Nov. 9, 2011

(65) Prior Publication Data

US 2012/0118093 A1    May 17, 2012

(30) Foreign Application Priority Data

Nov. 11, 2010   (EP) ..................................... 10190884

(51) Int. Cl.
*F16H 55/00* (2006.01)
*F16H 55/08* (2006.01)
*F16H 55/10* (2006.01)
*G04B 13/02* (2006.01)

(52) U.S. Cl.
CPC .............. *G04B 13/027* (2013.01); *F16H 55/08* (2013.01)
USPC .............................................. 74/462; 74/457

(58) Field of Classification Search
CPC ..... F16H 35/16; F16H 35/02; F16H 55/0806; F16H 55/08; G04B 13/027
USPC .......................... 74/457, 458, 459.5, 460, 462
See application file for complete search history.

(56) References Cited

U.S. PATENT DOCUMENTS

| | | | | |
|---|---|---|---|---|
| 3,220,279 | A | * | 11/1965 | Dareing ........................... 74/462 |
| 3,631,736 | A | * | 1/1972 | Saari ............................... 74/462 |
| 4,640,149 | A | * | 2/1987 | Drago ............................. 74/462 |
| 4,823,638 | A | * | 4/1989 | Ishikawa ......................... 74/640 |
| 5,546,824 | A | * | 8/1996 | Miller et al. ................. 74/421 R |
| 2003/0195076 | A1 | * | 10/2003 | Ballard .......................... 475/168 |
| 2007/0207051 | A1 | * | 9/2007 | Katz ........................... 418/206.1 |
| 2008/0115610 | A1 | * | 5/2008 | Cisek et al. ..................... 74/462 |
| 2008/0282827 | A1 | * | 11/2008 | Jiang et al. ...................... 74/462 |

FOREIGN PATENT DOCUMENTS

| | | |
|---|---|---|
| CH | 699 679 A2 | 4/2010 |
| DE | 1 960 927 | 6/1971 |

OTHER PUBLICATIONS

European Search Report issued May 6, 2011 in Application No. EP 10 19 0884.
R. Naville, et al., "Theorie et taillage des engrenages d'horlogerie", Journal Suisse D'Horlogerie, vol. 1/2, 1967, XP-001219311, pp. 51-57.

* cited by examiner

*Primary Examiner* — Troy Chambers
*Assistant Examiner* — Jake Cook
(74) *Attorney, Agent, or Firm* — Oblon, Spivak, McClelland, Maier & Neustadt, L.L.P.

(57) ABSTRACT

A functional portion of an edge of each tooth of the toothed wheel has a profile which complies with the parametric double formula (in Cartesian coordinates):

$$x(u) = R_1\left[\cos\left(\frac{1}{\mu}\ln(1-\mu u)\right) - u\sin\left(\frac{1}{\mu}\ln(1-\mu u)\right)\right]$$

$$y(u) = R_1\left[\sin\left(\frac{1}{\mu}\ln(1-\mu u)\right) + u\cos\left(\frac{1}{\mu}\ln(1-\mu u)\right)\right]$$

where $R_1 = d_1 \cos(\alpha - a\tan\mu)$, $\alpha$ and $d_1$ being parameters, where $\mu$ is a parameter which corresponds to the coefficient of friction at the contact between said edge and an edge of a tooth of another wheel, $\mu$ being able to take values between 0.05 and 0.5, and where u is a variable which varies in the interval $(0, 1/\mu)$ such that by varying u, the profile is passed through.

2 Claims, 8 Drawing Sheets

GEARING PROFILE WITH CONSTANT TORQUE

This application claims priority from European Patent Application No. EP10190884.6 filed Nov. 11, 2010, the entire disclosure of which is incorporated herein by reference.

FIELD OF THE INVENTION

The present invention relates in general to the wheels and pinions constituting the geartrain of the watch and more particularly the profile of the teeth of these wheels and of these pinions. The present invention likewise relates to watch movements, as well as timepieces comprising wheels or pinions according to the invention.

STATE OF THE ART

It is known that, in a watch, the oscillations of a sprung balance are never perfectly isochronic. In other words, the duration of the oscillations is not totally independent of their amplitude. It is also known that if the total angle of oscillation of the balance wheel exceeds a limit value, the pin of the balance wheel roller can abut against the outside of the fork, which causes a significant advance in the movement of the watch. It is therefore said of this latter that it knocks. It is understood from the preceding that it is desirable to equalise as far as possible the amplitude of the oscillations of the balance wheel.

Variations in the amplitude of the oscillations of a spiral balance wheel can have multiple causes. It is well known for one that the intensity of the friction undergone by the balance wheel pivots increases when the watch is displaced from the horizontal position towards the vertical position. On the other hand, it is well known that variations in the force transmitted by the escapement to the balance wheel can likewise cause variations in amplitude of the balance wheel oscillations.

Various factors can be at the root of variations in the force transmitted from the escapement to the balance wheel. Firstly, the tension of the barrel spring depends upon the degree of winding of the latter. This normally leads to a variation in the force transmitted by the geartrain as a function of the power reserve. On the other hand, in a gearing, the contact point between the profiles of the flanks of two teeth which mesh moves radially during a tooth drive, climbing towards the head of the driving tooth. This phenomenon is illustrated schematically in the annexed FIG. 1, which shows the meshing of a driving wheel 10 with eighty two teeth and a pitch circle radius R1, with a driven wheel 11 with twelve teeth and a pitch circle radius R2. The arrow indicates the direction of rotation. The locus of the contact points, termed line of meshing 12, extends from point A to point B and crosses the two pitch circles of the wheels to the vicinity of the line of the centres 13 which connects the centres of the two wheels. In known gearings, whilst the contact point of the driving wheel with the driven wheel travels along the meshing line, the ratio between transmitted torque and received torque is not constant. On the contrary in the course of a tooth drive, this ratio varies as for example the curve 14 shows opposite the vertical central scale of FIG. 1.

In a watch movement, it is the geartrain which transmits the force from the barrel to the escapement. It is known that this geartrain is a multiplying geartrain. Thus, if at the downstream end of the geartrain the escapement wheel advances normally by a few steps per second, the upstream part of the geartrain scarcely moves during this same period of time. In these conditions, a single tooth drive in the upstream part of the geartrain can last for a considerably number of oscillations of the balance wheel. It will therefore be understood that the variation in the torque transmitted in the course of one tooth drive upstream of the gearing lasts generally for enough time to affect the amplitude of the oscillations of the balance wheel.

Finally, the force transmitted from the escapement to the balance wheel can likewise vary from one timepiece to the other, and this is the case even if these timepieces are in theory identical. In fact, because of the high degree of miniaturisation which is characteristic of clock and watchmaking, the manufacturing tolerances in the positioning of the wheels and the pinions of a watch can be sufficient to affect substantially the force transmitted by the geartrain of the watch. The reason for this is, that with the gearing profiles which are known, the torque transmitted in a gearing varies considerably as soon as the distance between the axes of rotation of the two toothed wheels deviates from the theoretical value. A major disadvantage of this sensitivity of the gearings to axial centre distance variations is that it is necessary to measure, for a considerable time, the amplitude of the oscillations of the balance wheel of each example of a watch movement in order to eliminate any risk of a knocking.

In the field of clock and watchmaking, it is known to determine the profile of the teeth of the toothed wheels and of the blades of the pinions on the basis of geometric curves such as: the cycloid, epicycloid, hypocycloid or the involute to a circle. The wheels and pinions thus obtained have the characteristic of allowing a "proportional transmission" or, in other words, of transmitting a speed of rotation which remains constant in the course of one tooth drive. Moreover, the wheels and pinions provided with teeth, the profile of which is based on the involute to a circle, have the additional characteristic of allowing a proportional transmission, with the same transmission ratio, even when the distance between the axes of the two wheels deviates from the theoretical value.

FIG. 2A, which represents a gearing with an involute to a circle, shows the meshing of a wheel 1 with twenty four teeth with a wheel 2 with sixteen teeth. FIG. 2A further shows two concentric circles superimposed on each of the two wheels. The smaller of these two circles (respectively with the references B1 and B2) is the base circle of the involute. The greater circle (respectively with the references P1 and P2) is the pitch circle. The pitch circle P1 of the wheel 1 and the pitch circle P2 of the wheel 2 are tangent by definition. Moreover, the ratio of the radii $d_1$ and $d_2$ of the pitch circles is chosen equal to the gearing ratio. It should be noted that, contrary to the radii $d_1$ and $d_2$ of the pitch circles, the radii $R_1$ and $R_2$ of the two base circles B1 and B2 do not depend upon the distance between the centres of the two wheels. However, by definition, they are of the same ratio as $d_1$ and $d_2$.

The line of meshing 7 has again been represented in FIGS. 2A and 2B. It can be observed that, in the illustrated example, the meshing line has the shape of a straight line segment delimited by the two points A and B. It can be noted moreover that, according to a distinctive feature of the gearings with the involute to a circle, the straight line which subtends the meshing line 7 is exactly tangential to the two base circles B1 and B2. Another distinctive feature of the gearings with the involute to a circle is that the common normal to the edges of two teeth at the contact point is always orientated in the direction of the line of meshing (FIG. 2B). An advantageous feature of gearings with the involute to a circle is that the ratio between the angular speeds of the driving and driven wheels remains constant and independent of the axial centre distance between the wheels. In other words, as has already been said, the gearing with the involute to a circle has the feature of allowing proportional transmission, with the same transmission ratio, even when the distance between the axes of the two wheels deviates from the nominal value. One might be tempted to conclude from the preceding that the torque transmitted by a gearing with the involute to a circle remains constant in the course of a tooth drive and whatever the axial centre distance between the two wheels. However, in so doing, this neglects the friction forces which are inevitable as soon as the gearing is no longer in equilibrium. In fact, the rotation of the wheels is always accompanied by a sliding of surfaces in contact on each other and therefore also by friction forces tangential to the flanks of the two teeth in contact. It will be understood that these friction forces are perpendicular to the common perpendicular to the edges of the two teeth at the contact point. The friction forces therefore have the effect of making the force transmitted diverge from the direction of the line of meshing. If reference is now made to FIG. 3 which is similar to FIG. 2B, there can be seen the forces exerted by the edges in contact on each other (these forces are represented by two opposing arrows which have their origin at the contact point between two teeth). It can be observed that the direction of these forces is not collinear with the meshing line. A consequence of the divergence between force and meshing line is that the transmitted torque is not constant in the course of a tooth drive.

In fact, it can be shown that in order to transmit a constant torque it is necessary that, from the beginning to the end of a tooth drive, the force at the contact between two teeth is constantly orientated towards the same point of the line of the centres (reference $P_o$ in FIGS. 8A, 8B and 8C). It will be understood therefore from the preceding that a gearing with the involute to a circle cannot transmit a constant torque unless the teeth in contact can slide one on the other without friction.

BRIEF PRESENTATION OF THE INVENTION

An aim of the present invention is therefore to remedy the disadvantages of prior art by providing a gearing profile which has the property of transmitting a constant torque in the course of a tooth drive, even when the distance between the axes of the two wheels deviates from the theoretical value. The present invention achieves this aim by providing, on the one hand, a wheel or a pinion according to claim 1 and, on the other hand, a watch movement or a timepiece comprising wheels or pinions according to the invention.

BRIEF DESCRIPTION OF THE FIGURES

Other features and advantages of the present invention will appear upon reading the description which will follow, given solely by way of example and non-limiting, with reference to the annexed drawings in which.

DETAILED DESCRIPTION OF AN EMBODIMENT, GIVEN BY WAY OF EXAMPLE

Figure 1:
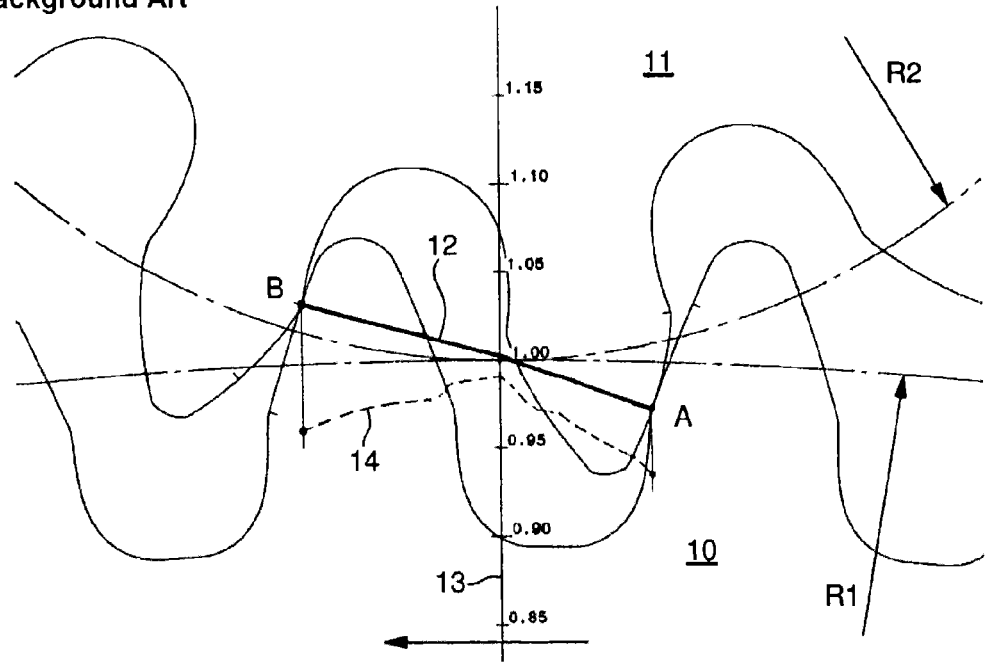
FIG. 1 is a partial schematic view of a known gearing.
Figure 3:
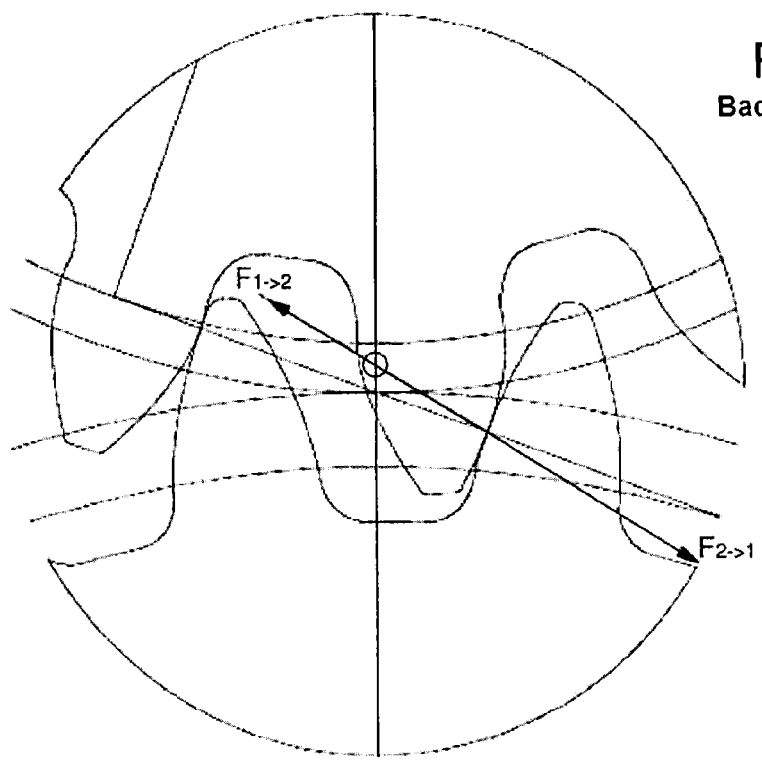
FIG. 3 is a schematic view similar to that of FIG. 2B and in which the forces exerted by the teeth on each other at the contact point are represented in addition.
Figure 2B:
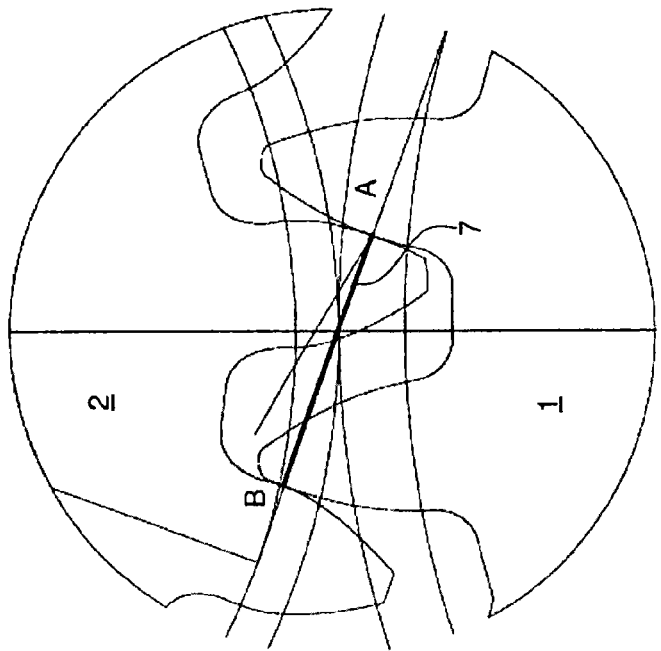
FIG. 2B is a partial enlarged schematic view of the gearing with the involute to a circle of FIG. 2A.
Figure 2A:
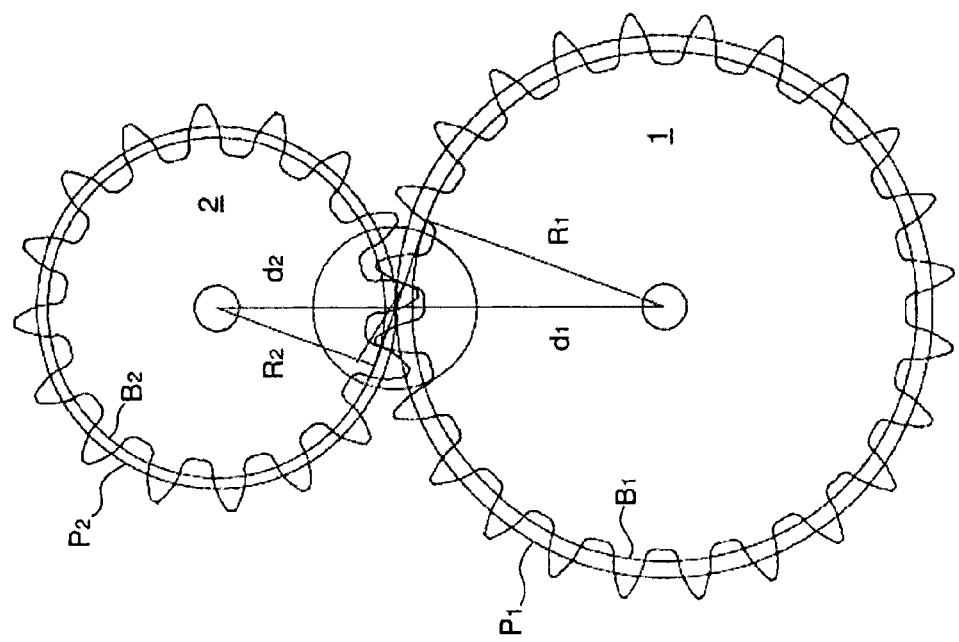
FIG. 2A is a schematic representation of a known gearing with the involute to a circle.
Figure 4:
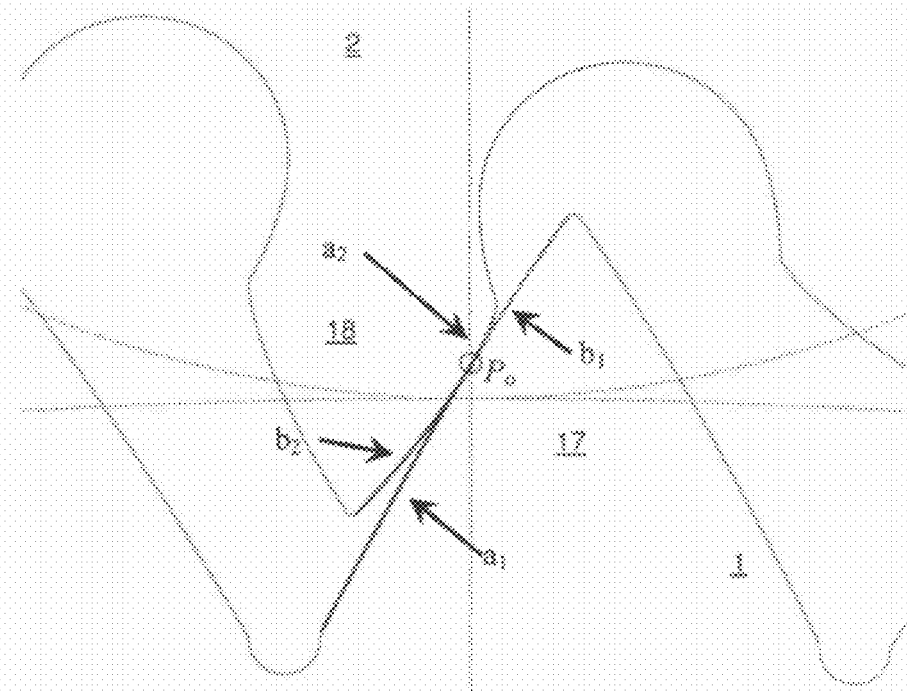
FIG. 4 is a partial schematic view of a gearing according to the present invention at the instant where the contact point between two teeth coincides with the line of the centres.

FIG. 4 is a partial schematic view of a gearing according to the present invention at the instant where the contact point between two teeth 17, 18 (reference $P_o$) is situated on the line of the centres. The pages which follow are devoted to the brief description of a process for producing the gearing of FIG. 4.

The process about to be described has its starting point at a moment where the value of certain parameters is already known (or chosen). These parameters are the following:
the nominal axial centre distance "d";
the axial centre distance tolerance, or in other words the interval [dmin, dmax] within which the profiles of the teeth must give a constant torque;
the numbers of teeth "$z_1$" and "$z_2$" of the two wheels;
the coefficient of friction "$\mu$" at the contact between two teeth.

1. The first step of the process is to fix the efficiency "$\epsilon$" which the gearing must have.

If the torque exerted by wheel 1 on wheel 2 is designated by $M_{1 \to 2}$, the reaction of wheel 2 on wheel 1 by $M_{2 \to 1}$, the work (energy) provided by wheel 1 to wheel 2 in the course of a tooth drive is equal to $2\pi/z_1 \, M_{1 \to 2}$ and the energy received by wheel 2 is equal to $2\pi/z_2 \, M_{2 \to 1}$. In these conditions, if the efficiency output equals $\epsilon$, then there is given $2\pi/z_2 \, M_{2 \to 1} = \epsilon \, 2\pi/z_1 \, M_{1 \to 2}$, or equivalently $$\varepsilon = \frac{M_{1 \to 2}}{M_{2 \to 1}} \frac{z_1}{z_2}.$$

In order to construct the profile according to the invention, it is necessary to choose the average efficiency "$\epsilon$". A value of $\epsilon$ quite close to 1 is chosen for preference, for example in the interval [0.9; 0.99].

If $d_1$ is the distance between the centre of wheel 1 and $P_o$, i.e. the intersection between the line of the centres and the meshing line, and if $d_2$ is the distance between the centre of wheel 2 and $P_o$, it will be understood that $$\frac{M_{1\to 2}}{M_{2\to 1}} = \frac{d_2}{d_1}.$$

In fact, on the one hand, the force $F_{1\to 2}$ exerted by wheel 1 on wheel 2 is equal to the reaction force $F_{2\to 1}$ of wheel 2 on wheel 1 and, on the other hand, at the instant where the contact point is on the line of the centres, there is given: $M_{2\to 1}=d_1 \sin\beta\, F_{2\to 1}$ and $M_{1\to 2}=d_2 \sin\beta\, F_{1\to 2}$ (where $\beta$ is the angle which the force makes with the line of the centres).

Figure 5:
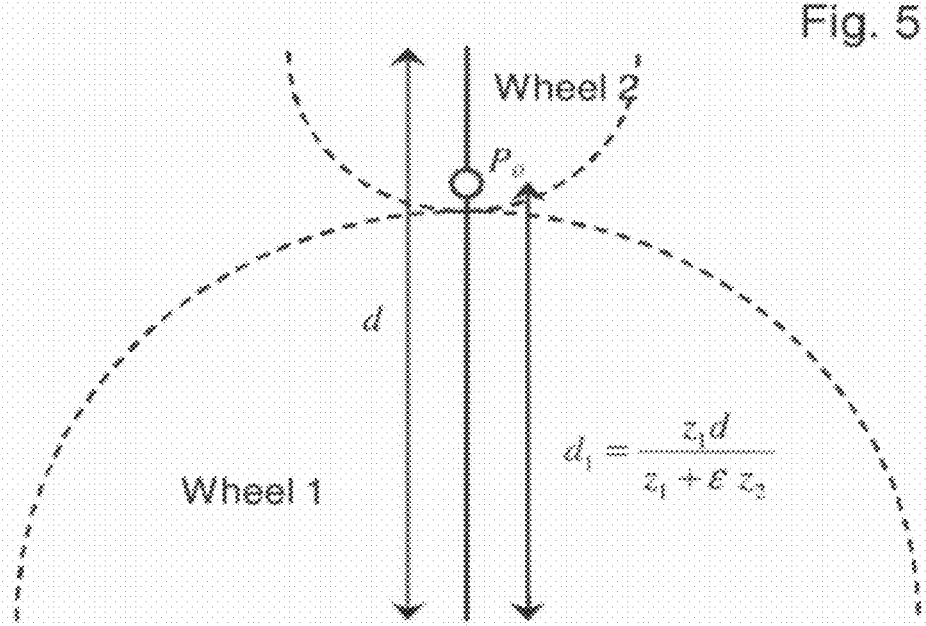
FIG. 5 illustrates the relation between the position of the contact point between two teeth along the line of the centres and the average output of the gearing.

The position of the contact point $P_o$ on the line of the centres therefore depends upon the value of the output "$\epsilon$" across the relation $$\frac{d_2}{d_1} = \varepsilon \frac{z_2}{z_1}$$

with $d_1+d_2=d$. FIG. 5 illustrates this relation graphically.

2. The second step of the process is to choose an angle of inclination of the teeth.

Figure 6:
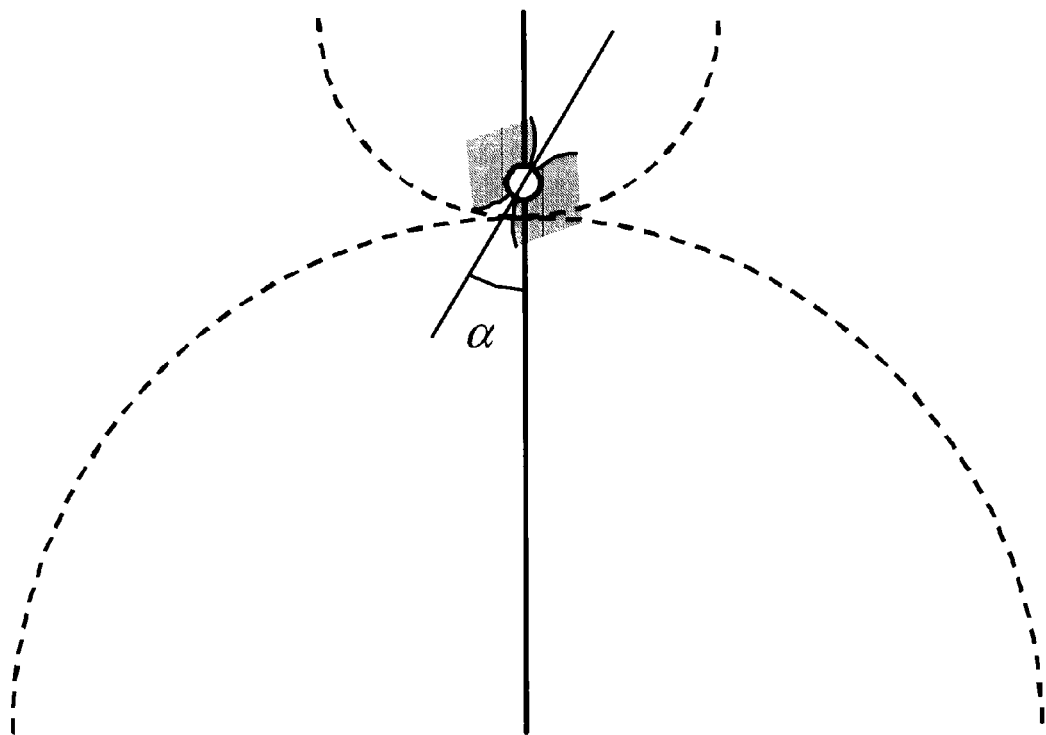
FIG. 6 shows the angle of inclination of the edges of the teeth at the contact point during passage of the line of the centres.

As in the case of the known gearing profiles, it is necessary to choose the inclination of the teeth. As illustrated by FIG. 6, in the present example, the inclination of the edges of the teeth is chosen at the contact point $P_o$ on the line of the centres. This inclination can be expressed in terms of the angle $\alpha$ between the tangent for one tooth at $P_o$ and the line of the centres. This angle is chosen preferably between 10° and 30°.

3. The third step of the process is to calculate the radii $R_1$ and $R_2$ for the base circles.

Figure 7:
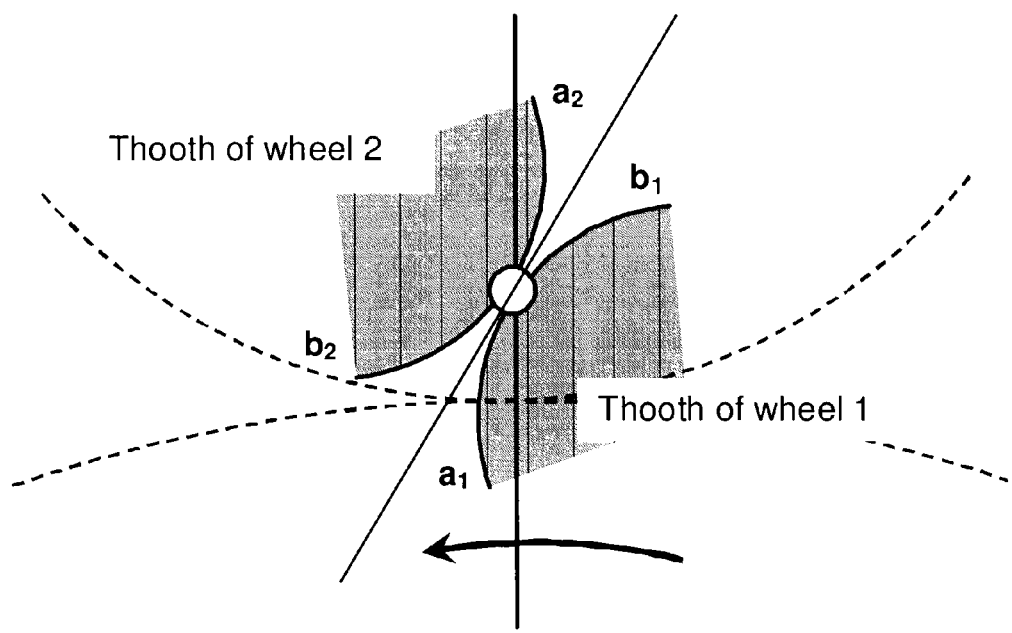
FIG. 7 illustrates the construction of the functional head and foot portions of the edges of the teeth of the two wheels of the gearing.

In the present example, the functional (or useful) part of the edge of each tooth is formed from two portions "a" and "b"; a useful head portion and a useful foot portion. As can be seen in FIG. 7, the foot and head portions are joined at the point $P_o$ which is common to the two teeth in contact. The functional part of the edge of the tooth of wheel 1 is formed by a useful foot portion with the reference "$a_1$" and by a useful head portion with the reference "$b_1$". Similarly, the functional part of the edge of the tooth of wheel 2 is formed by a useful foot portion with the reference "$a_2$" and by a useful head portion with the reference "$b_2$".

Again with reference to FIG. 4 in addition to FIG. 7, it will be understood that this is firstly the foot portion a1 of the edge of the tooth of the driving wheel (wheel 1) which pushes the head portion b2 of the edge of the tooth of the driven wheel (wheel 2). Then it is the head portion b1 which pushes the foot portion a2. Furthermore, the frictional force $F_f=\mu F_n$ between the edges of the two teeth in contact changes direction when the contact point crosses through the line of the centres or, in other words, the frictional force changes direction at the point Po. Therefore, the coefficient of friction "$\mu$" is considered to be negative before crossing the line of the centres (friction between portions a1 and b2) and to be positive afterwards (friction between portions b1 and a2).

The base radii $R_1$ and $R_2$ of the two wheels are given by the following formulae:

$R_1=d_1 \cos(\alpha-a\tan\mu)$ $R_2=d_2 \cos(\alpha-a\tan\mu)$

A tooth will therefore be formed from two portions of different profiles, as occurs with cycloids for example. In fact, as the coefficient of friction changes sign at $P_o$ there will be two base radii R(a) and R(b) for each tooth. A base radius for part a and a base radius for part b of the edge of the tooth. According to the present invention, the profiles of the two portions a and b are tangents at the point $P_o$.

The fourth step of the process is to calculate the profiles of portions a and b of each tooth.

Parts a and b of the teeth of each wheel are calculated by the following formulae:

$$x(u) = R_1\left[\cos\left(\frac{1}{\mu}\ln(1-\mu u)\right) - u\sin\left(\frac{1}{\mu}\ln(1-\mu u)\right)\right]$$

$$y(u) = R_1\left[\sin\left(\frac{1}{\mu}\ln(1-\mu u)\right) + u\cos\left(\frac{1}{\mu}\ln(1-\mu u)\right)\right]$$

It can be noted that the two relations above have the result that:

$$x^2+y^2=R^2(1+u^2).$$

In the formulae above, the base radius R is determined as explained above. On the other hand, u is a parameter which varies in the interval $[0, 1/\mu]$. By varying u, the curve is passed through. For each portion, the initial value ($u_{ini}$) of the variable u is determined in order that the corresponding radial coordinate is equal to $d_1$ (for wheel 1) and $d_2$ (for wheel 2), or in other words, so that the value $u_{ini}$ corresponds to the point $P_o$. As there is a different value for R for each tooth portion $a_1$, $b_1$, $a_2$ and $b_2$, there will likewise be for each tooth and for each portion a or b, a different initial variable $u_{ini}$. Each portion a or b of each tooth 1 or 2 is prolonged starting from $P_o$ by varying u from $u_{ini}$ in an increasing or decreasing manner so that the profile extends "in the right direction" (that is to say radial decreasing coordinates for portions a and radial increasing coordinates for portions b).

Furthermore, it will be noted that it is necessary again to effect a rotation of the profiles obtained by formulae x and y above in order to move each portion a or b of the profile of each wheel 1 or 2 into the position where the contact point is on the line of the centres.

The fifth step of the process is to determine the extent of portions a and b.

By varying the variable u from the initial value $u_{ini}$ in the interval $[0, 1/\mu]$, the portions a and b of the profiles can be lengthened: until infinity for portions b (which corresponds to u tending towards $1/\mu$) and up to the base radius R for portions a (which corresponds to the limit u=0). The values $u_{fin}$ of variable u determining the extent of these portions will be chosen simply so that, taking into account the chosen axial centre distance tolerance, the contact between the two teeth will always be on the functional or useful portions a and b of the edge of a tooth whatever the axial centre distance. The person skilled in the art will likewise ensure that the profile of one tooth does not encroach on the profile of the following tooth of the wheel. In order to do this, he will be able to act both on the choice of the angle $\lambda$, of inclination of the edges of the teeth and on that of the efficiency "$\epsilon$" of the gearing.

6. The sixth step of the process is to add feet and heads to the teeth.

The formulae given above only describe the functional portions of the profile of the teeth, i.e. the zone where contact with another tooth can take place. It is however necessary to complete the toothing by "closing" each tooth by the addition of a "non-functional" head, and likewise by adding feet which are joined with the feet of the neighbouring teeth. When these non-functional parts are added, it is important to avoid them interfering with the functional zones during meshing.

Numerical example:

nominal axial centre distance d=2.958 mm;

axial centre distance interval [dmin, dmax]=[2.913 mm, 2.968 mm];

number of teeth of the two wheels, $z1=82$ and $z2=12$;
coefficient of friction $\mu=0.2$;
fraction of torque to be transmitted: $\epsilon=0.966$;
angle of inclination: $\alpha=30.5°$.

It follows from the values above that:
for portion $a_1$
$R=1.932$ mm, $u_{ini}=0.894$ and $u_{fin}=0.821$;
for portion $a_2$
$R=0.346$ mm, $u_{ini}=0.348$ and $u_{fin}=0.013$;
for portion $b_1$
$R=2.447$ mm, $u_{ini}=0.348$ and $u_{fin}=0.408$;
for portion $b_2$
$R=0.273$ mm, $u_{ini}=0.894$ and $u_{fin}=1.162$.

Figure 8A:
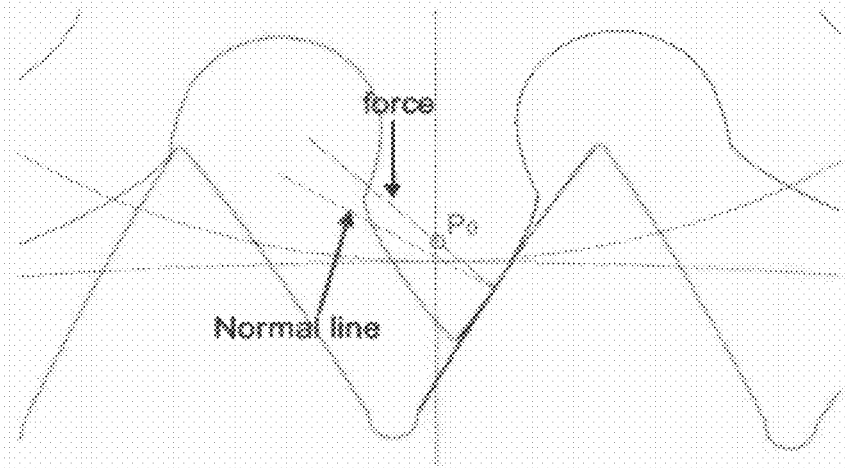
FIGS. 8A, 8B and 8C correspond to three successive snapshots showing in fact that, in a gearing according to the present invention, the direction of the transmitted force always intersects the line of the centres at the same point.
Figure 8B:
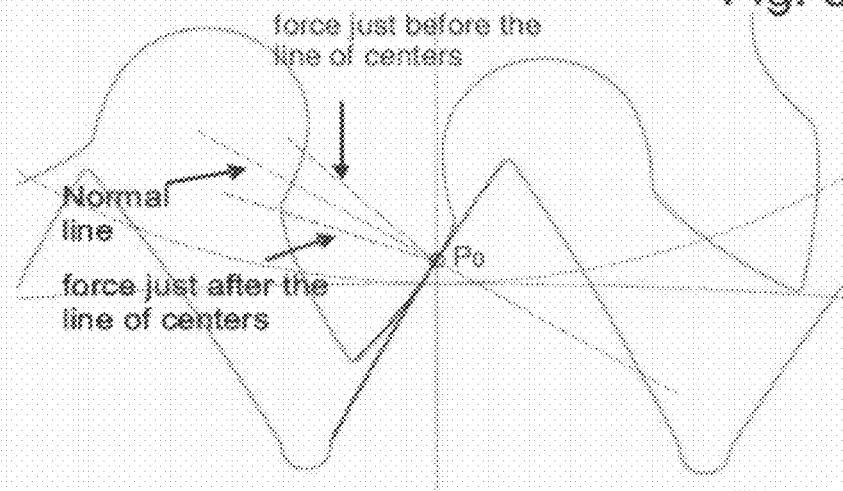
Figure 8C:
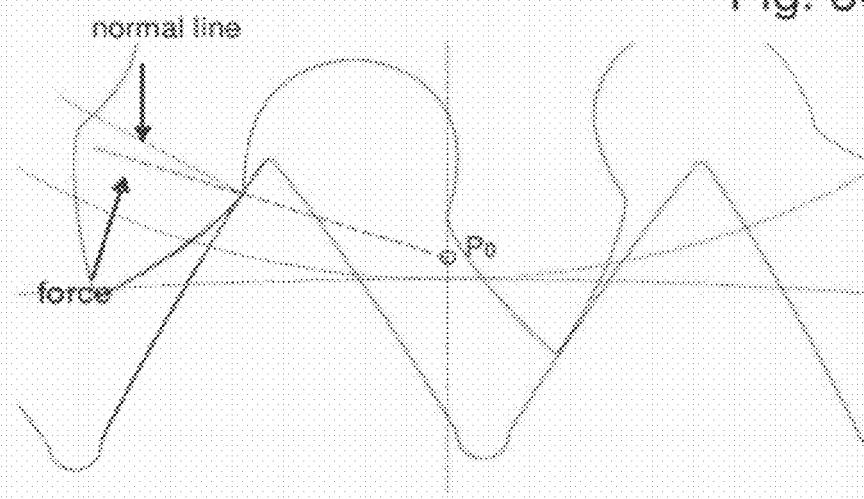

FIGS. 8A, 8B and 8C are three successive snapshots during a tooth drive in a gearing according to the present invention. FIG. 8A corresponds to an instant where the contact point is situated before the line of the centres whilst FIG. 8C corresponds to an instant where the contact point is situated after the line of the centres. Between the two, FIG. 8B shows a contact point on the line of the centres. As FIGS. 8A and 8C illustrate, the reaction force of the surfaces on each other is not normal to them but oblique. Furthermore, as the direction of sliding of the surfaces on each other is opposite on both sides of the meshing point, the deviation of the direction of the force relative to the normal is likewise in the opposite direction on both sides of the meshing point.

FIGS. 8A, 8B and 8C again make it possible to verify that the direction of force at the contact point relates to the intersection point $P_o$ during the entire meshing period of the two edges. This feature is a necessary condition for making it possible to have a constant transmitted torque. As already mentioned, one advantage of the gearing profiles according to the present invention is that the torque is always transmitted in an approximately constant manner, even if the distance between the centres of the two wheels differs from the theoretical norm.

Figure 9:
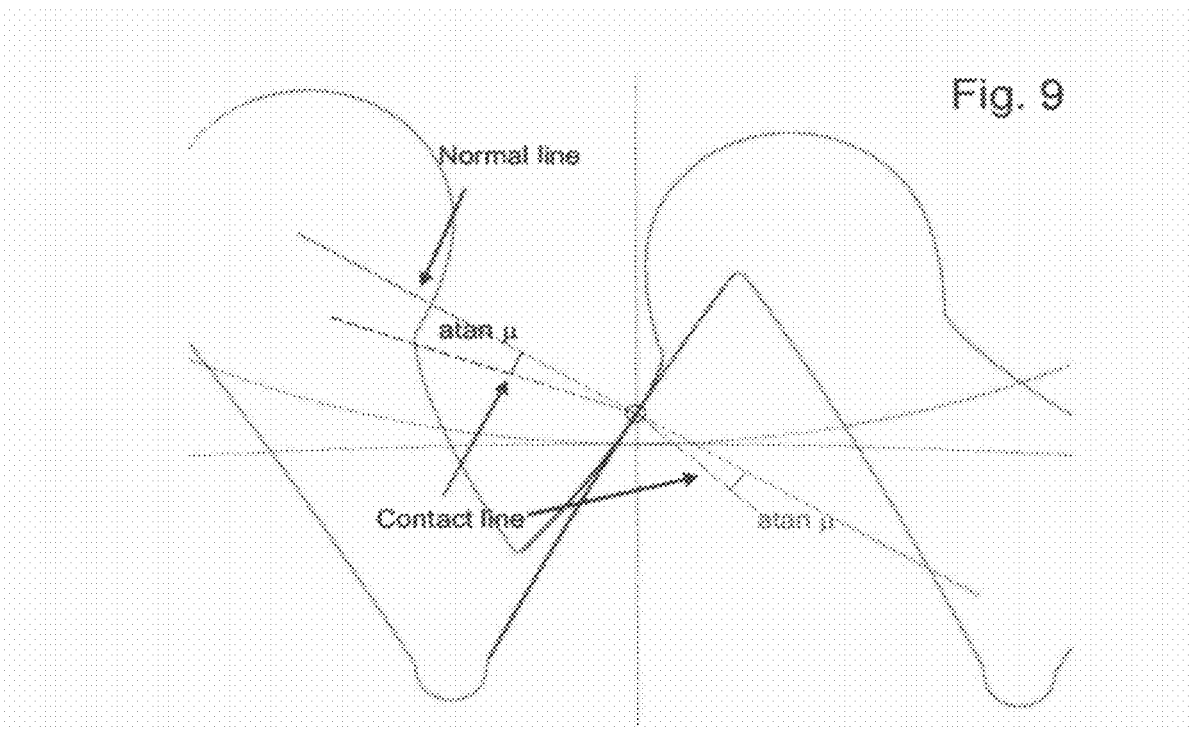
FIG. 9 is a schematic view similar to that of FIG. 8B and showing the line of meshing formed by two rectilinear segments.

Like FIG. 8B, FIG. 9 corresponds to the instant where the contact point is situated exactly on the line of the centres. In FIG. 9, the meshing line is indicated by a broken line. It can be seen that, contrary to what was the case with the involute to the circle, in a gearing according to the present invention, the meshing line is formed from two rectilinear segments which are joined at the point $P_o$. It will be understood furthermore that the direction of the meshing line corresponds at every point to the direction of the force. Finally it may be clarified that the angle between the meshing line and the normal which is common to the two edges in contact is equal to the tangential arc of the coefficient of friction.

Figure 10A:
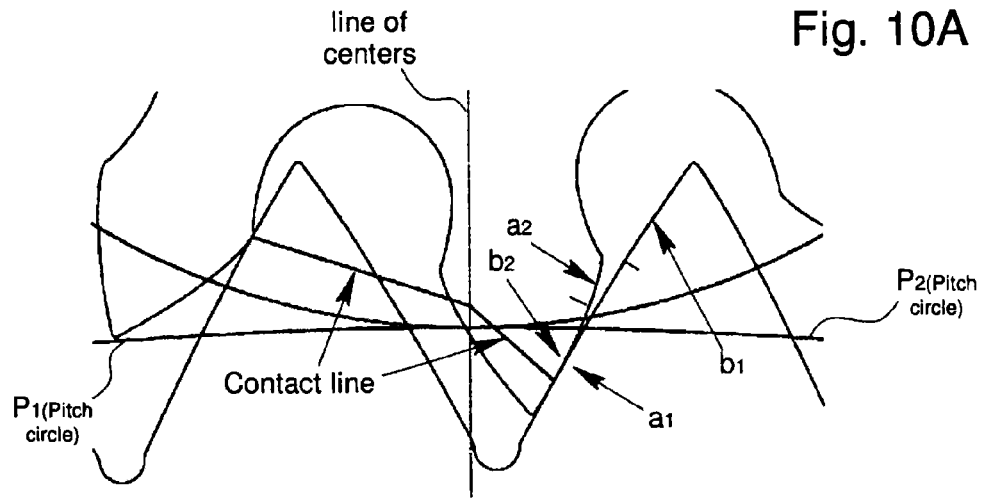
FIGS. 10A, 10B and 10C are three partial schematic views showing respectively the meshing of the same pair of wheels placed at three distances from each other.
Figure 10B:
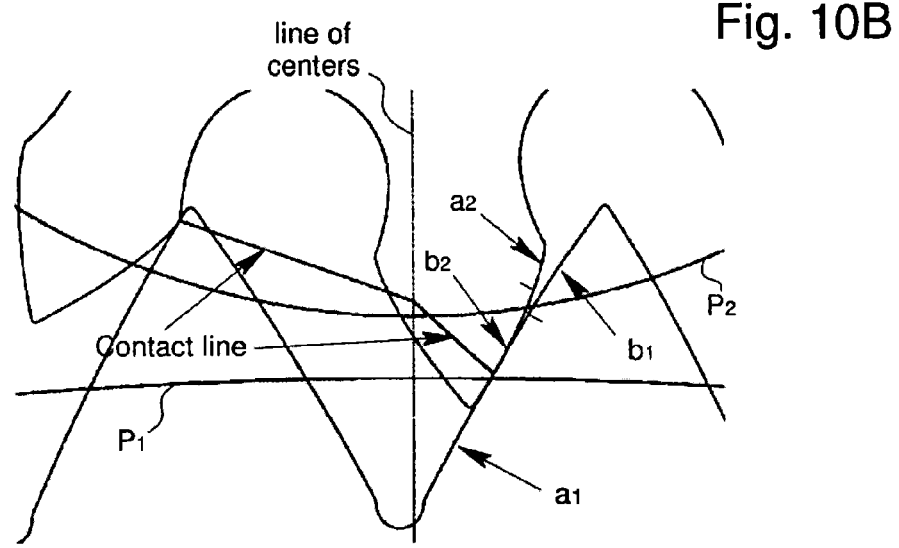
Figure 10C:
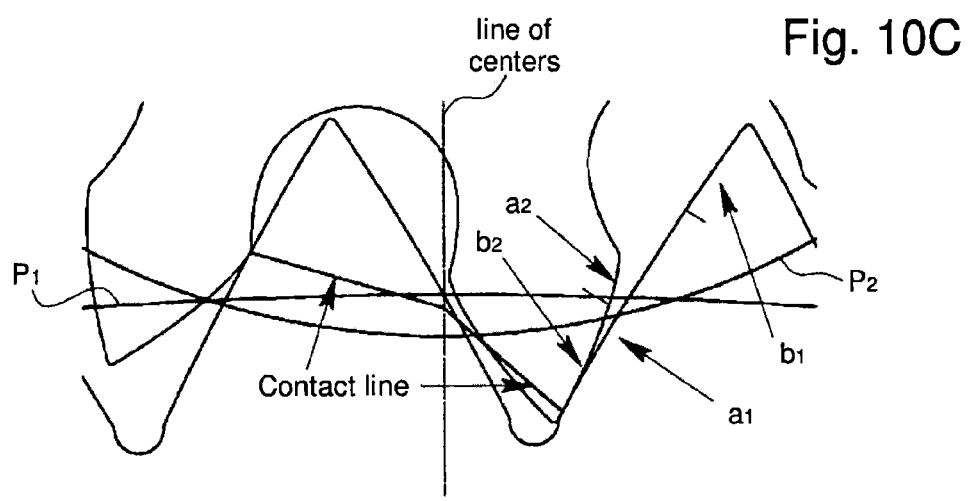

FIGS. 10A, 10B and 10C comprise three partial schematic views showing respectively the meshing of the same pair of wheels placed at three distances from each other. As for the graph of FIG. 11, it shows the variation of the torque transmitted during a tooth drive for three different axial centre distances corresponding respectively to FIGS. 10A, 10B and 10C. The curve in a continuous line corresponds to the nominal axial centre distance and therefore to the situation illustrated by FIG. 10A, the dotted curve corresponds to the situation illustrated by FIG. 10B, and finally the curve with alternating lines and dots corresponds to the situation of FIG. 10C.

Figure 11:
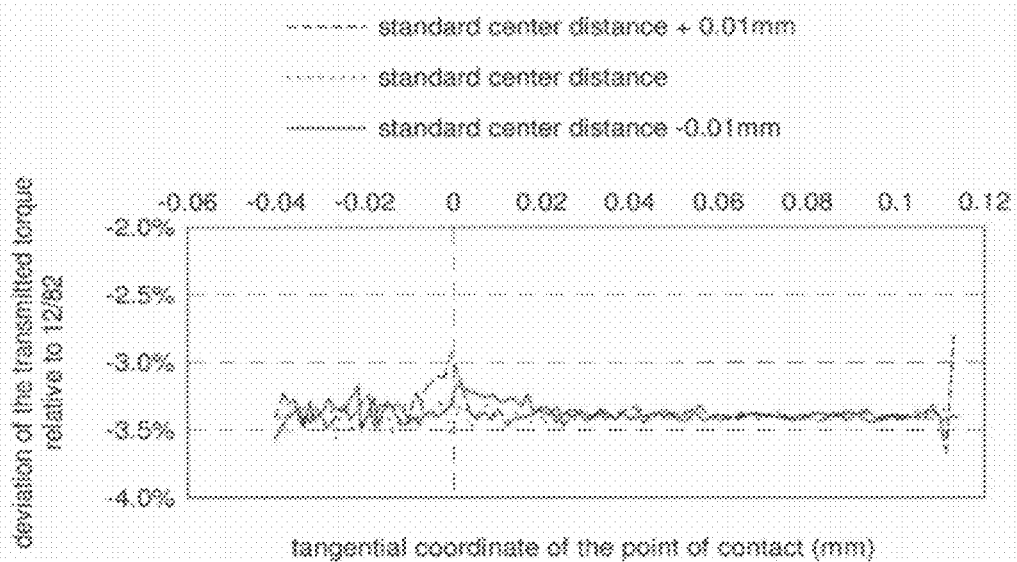
FIG. 11 is a graph comprising three curves respectively representing the variation in the torque transmitted in the course of a tooth drive in the three cases of the Figure represented in FIGS. 10A, 10B and 10C.

In the gearing represented in FIG. 10A, the distance between the centres of the two wheels corresponds to the theoretical norm. In this "ideal" case, during passage of the line of the centres, the contact point between the teeth is situated exactly at the boundary between portion a and portion b of the edge of each of the wheels. In this case, as the curve in a continuous line of FIG. 11 shows, the transmitted torque is quasi constant.

In the gearing of FIG. 10B, the distance between the centres of the two wheels is greater than the theoretical norm. In the gearing of FIG. 10C, the distance between the centres of the two wheels is smaller than the normal distance. As shown by the curve of FIG. 11 formed from a chain of dots and also that formed by the alternating lines and dots, the transmitted torque remains quasi constant whilst the axial centre distance deviates from the nominal value, apart from around the passage from the line of the centres. In fact, when the distance between a wheel does not correspond to the nominal axial centre distance, the two transition points between foot portions and head portions of two teeth in contact never meet exactly. In these conditions, the passage of the contact point of one useful portion to the other does not take place simultaneously for the two teeth. This lack of simultaneity involves a transitory variation in the transmitted torque.

Figure 12A:
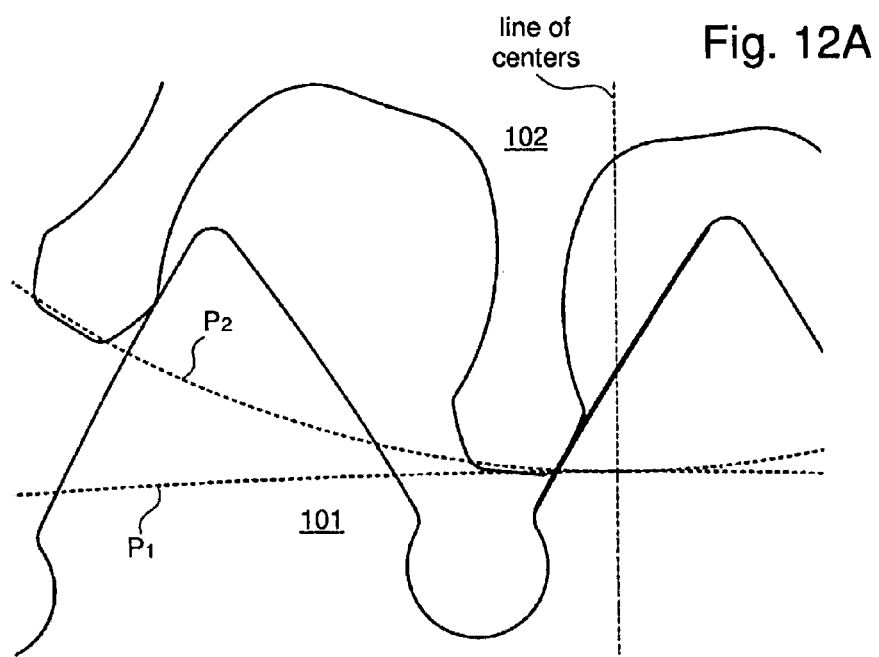
FIGS. 12A and 12B show a gearing according to a second embodiment of the present invention at two different instants during a tooth drive.
Figure 12B:
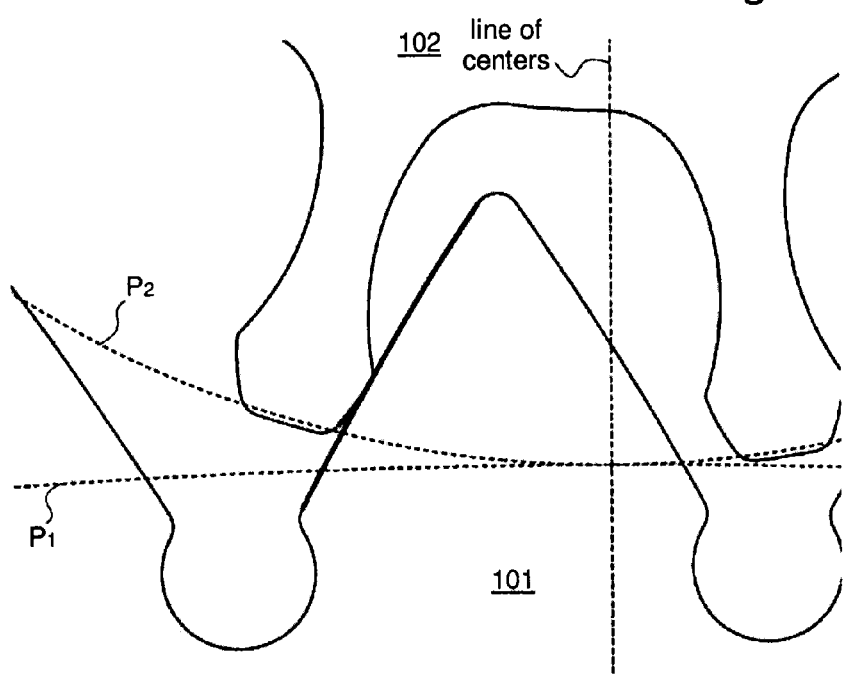

FIGS. 12A and 12B are successive snapshots during a tooth drive in a gearing according to a second embodiment of the present invention. According to this second embodiment, the functional part of the edge of one tooth comprises only one profile portion and not two as in the embodiment illustrated by FIGS. 7 to 11.

Assuming that the driving wheel is wheel 101 and that the driven wheel is wheel 102, it can be seen in FIGS. 12A and 12B that two teeth only come into contact after the line of the centres. In these conditions, if the same conventions as those adopted above are maintained, it can be said that the coefficient of friction "$\mu$" is always positive. In fact, contact between the edges always takes place after the line of the centres (it will be understood however that if these wheels turned in the other direction, wheel 102 being the driving wheel, and wheel 101 the driven wheel, then the contact between the edges would always be produced before the lines of the centres, and not after).

An advantage of the second embodiment of the present invention which has just been described is that the transitory variations in the transmitted torque are avoided, which variations are associated with the lack of simultaneity described above in relation to the first embodiment of the invention.

The proposed invention makes it possible in theory to achieve variations which are exactly zero (0%). However it is expected nevertheless to observe a variation when the axial centre distance is not normal or because the coefficient of friction can vary from one part to the other or in the course of time. However, the applicant was able to calculate that these variations are clearly less than with current profiles.

What is claimed is:

1. A gear train comprising:
   a first toothed wheel with a first number ($z_1$) of first teeth; and
   a second toothed wheel with a second number ($z_2$) of second teeth,
   the first teeth meshing with the second teeth so that the first wheel drives the second wheel, a distance between centers of the first and the second wheels deviating from a nominal axial center distance (d) by no more than a predefined axial center distance tolerance, wherein
   a first profile of one of the first teeth contactable to a corresponding one of the second teeth along a line of meshing is calculated with the following double formula in Cartesian coordinates:

$$x_1(u) = R_1\left[\cos\left(\frac{1}{\mu}\ln(1-\mu u)\right) - u\sin\left(\frac{1}{\mu}\ln(1-\mu u)\right)\right]$$

$$y_1(u) = R_1\left[\sin\left(\frac{1}{\mu}\ln(1-\mu u)\right) + u\cos\left(\frac{1}{\mu}\ln(1-\mu u)\right)\right]$$

where an origin ($x_1=0$; $y_1=0$) of the Cartesian coordinates is located at the center of the first wheel; where an orientation of the Cartesian coordinates is such that a coordinate point ($x_1(u)$; $y_1(u)$) is on a line of the centers when $$|u| = \sqrt[2]{\frac{d_1^2 - R_1^2}{R_1^2}};$$

and where $R_1 = d_1 \cos(\alpha - a\tan\mu)$ is a base radius;
wherein a second profile of said corresponding one of the second teeth is calculated with the following double formula in Cartesian coordinates:

$$x_2(u) = R_2\left[\cos\left(\frac{1}{\mu}\ln(1-\mu u)\right) - u\sin\left(\frac{1}{\mu}\ln(1-\mu u)\right)\right]$$

$$y_2(u) = R_2\left[\sin\left(\frac{1}{\mu}\ln(1-\mu u)\right) + u\cos\left(\frac{1}{\mu}\ln(1-\mu u)\right)\right]$$

where an origin ($x_2=0$; $y_2=0$) of the Cartesian coordinates is located at the center of the second wheel; where an orientation of the Cartesian coordinates is such that a coordinate point ($x_2(u)$; $y_2(u)$) is on the line of the centers when $$|u| = \sqrt[2]{\frac{d_2^2 - R_2^2}{R_2^2}};$$

and where $R_2 = d_2 \cos(\alpha - a\tan\mu)$ is a base radius; and wherein $\alpha$ corresponds to an angle between the line of the centers and a tangent to a tooth at a center contact point ($P_o$) corresponding to an intersection between the line of meshing and the line of the centers, $$d_1 = \frac{z_1 d}{\varepsilon z_2 + z_1}$$

is a nominal distance between the center of the first wheel and the center contact point ($P_o$), and $$d_2 = \frac{\varepsilon z_2 d}{\varepsilon z_2 + z_1}$$

is a nominal distance between the center of the second wheel and the center contact point ($P_o$), furthermore, $\varepsilon$ is an efficiency of gearing and $\mu$ is a positive parameter which corresponds to a coefficient of friction on the line of meshing between said one of the first teeth and said corresponding one of the second teeth, $\mu$ including values between 0.05 and 0.5, and where u is a variable which varies between 0 and $1/\mu$ such that by varying u, the first profile and the second profile are calculated.

2. The gear train according to claim 1, wherein said first profile comprises a foot portion ($a_1$) and a head portion ($b_1$) joined to each other at the center contact point ($P_o$), and said second profile comprises a foot portion ($a_2$) and a head portion ($b_2$) joined together at the center contact point ($P_o$), and wherein a negative parameter equal to $-\mu$ (minus the coefficient of friction) is substituted for the positive parameter when calculating the foot portion ($a_1$) of the first profile and when calculating the head portion ($b_2$) of the second profile as well as when calculating corresponding base radii ($R_{a1}$, $R_{b2}$), and wherein the positive parameter is used when calculating the head portion ($b_1$) of the first profile and when calculating the foot portion ($a_2$) of the second profile as well as when calculating corresponding base radii ($R_{b1}$, $R_{a2}$).

* * * * *